B. M. W. HANSON.
CYLINDRICAL GRINDING MACHINE.
APPLICATION FILED OCT. 7, 1918.
1,339,027.
Patented May 4, 1920.
12 SHEETS—SHEET 1.
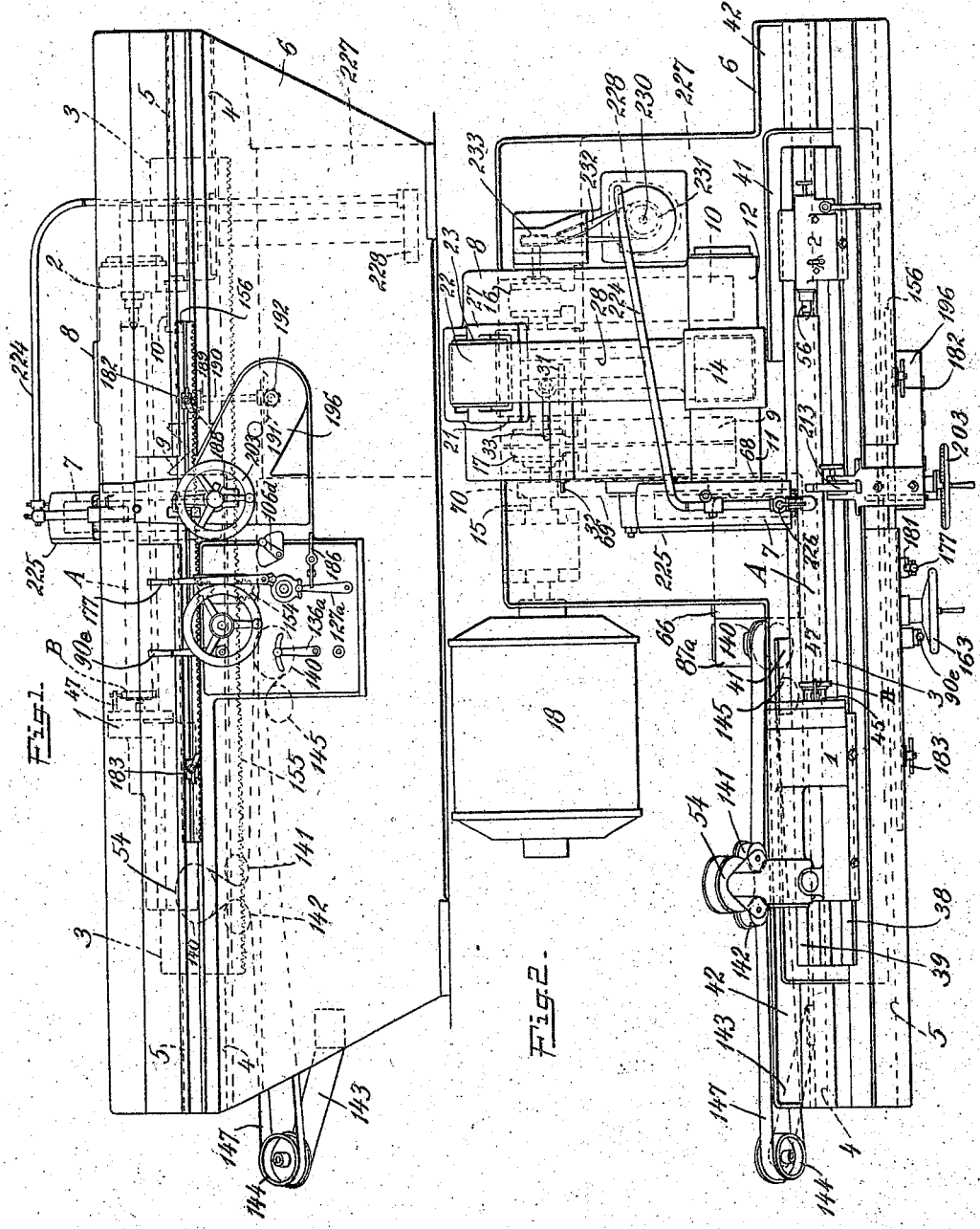
INVENTOR
Bengt M. W. Hanson
BY S. Jay Teller
ATTORNEY

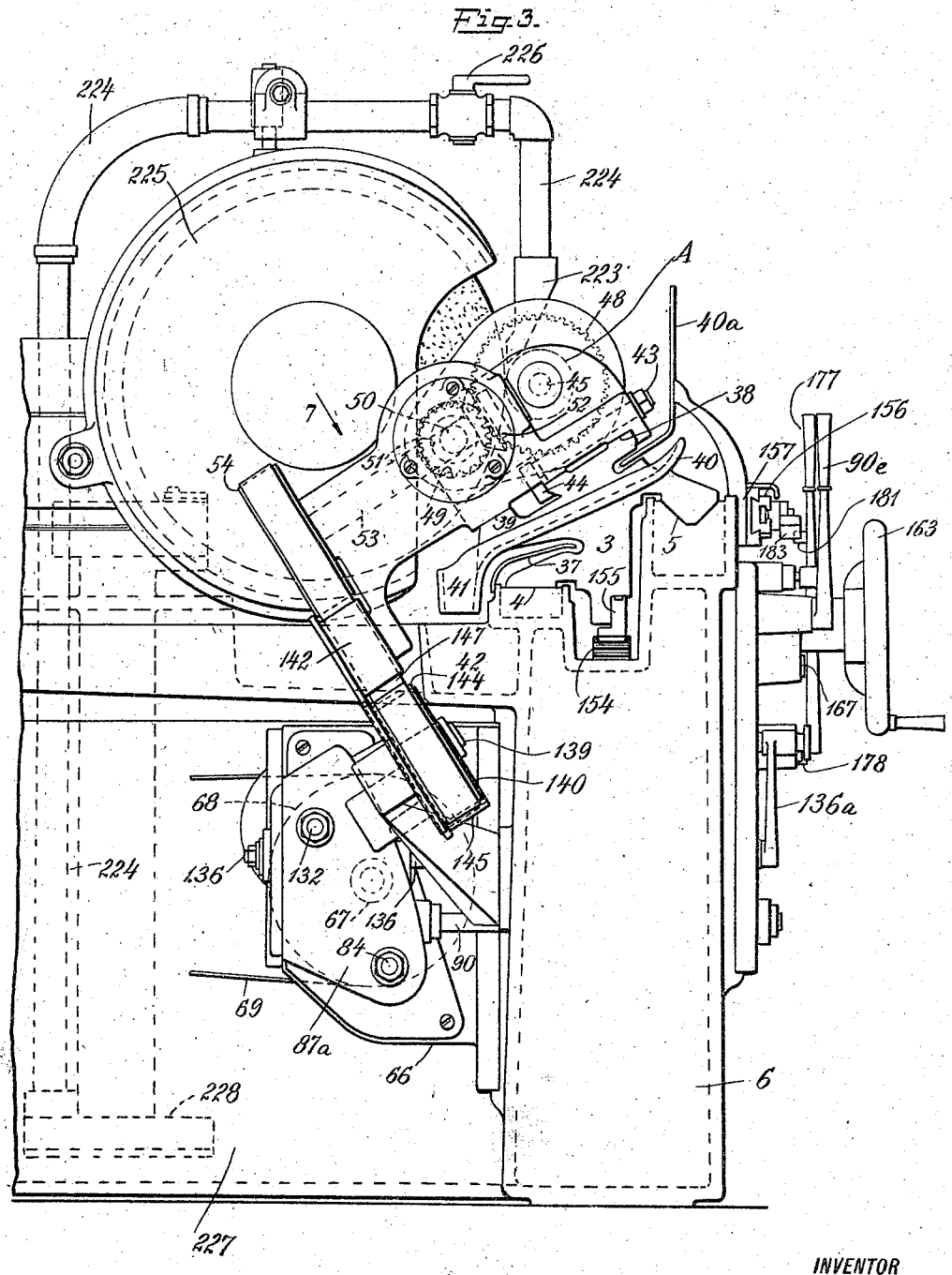

B. M. W. HANSON.
CYLINDRICAL GRINDING MACHINE.
APPLICATION FILED OCT. 7, 1918.
1,339,027.
Patented May 4, 1920.
12 SHEETS—SHEET 3.
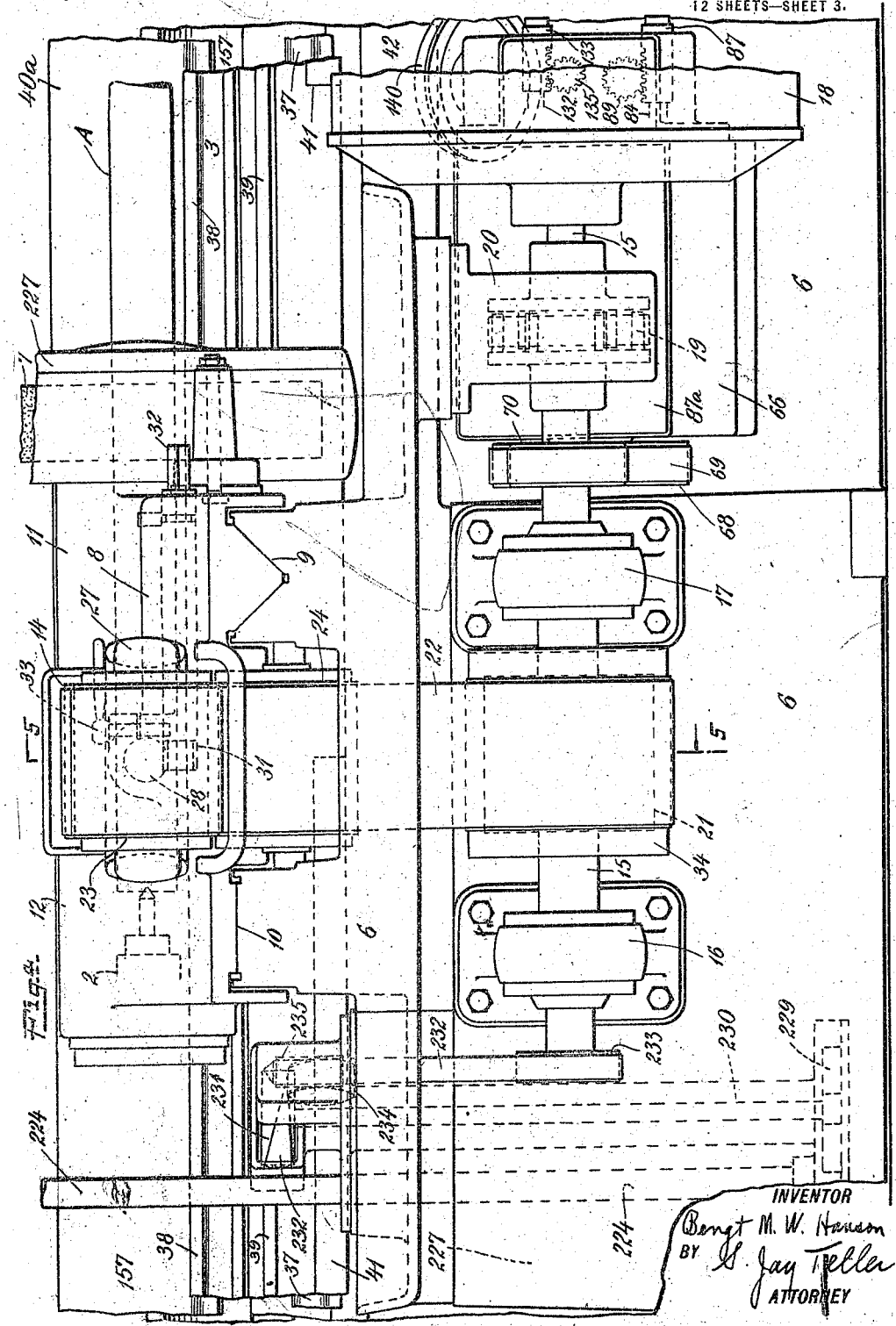
INVENTOR
Bengt M. W. Hanson
BY S. Jay Teller
ATTORNEY

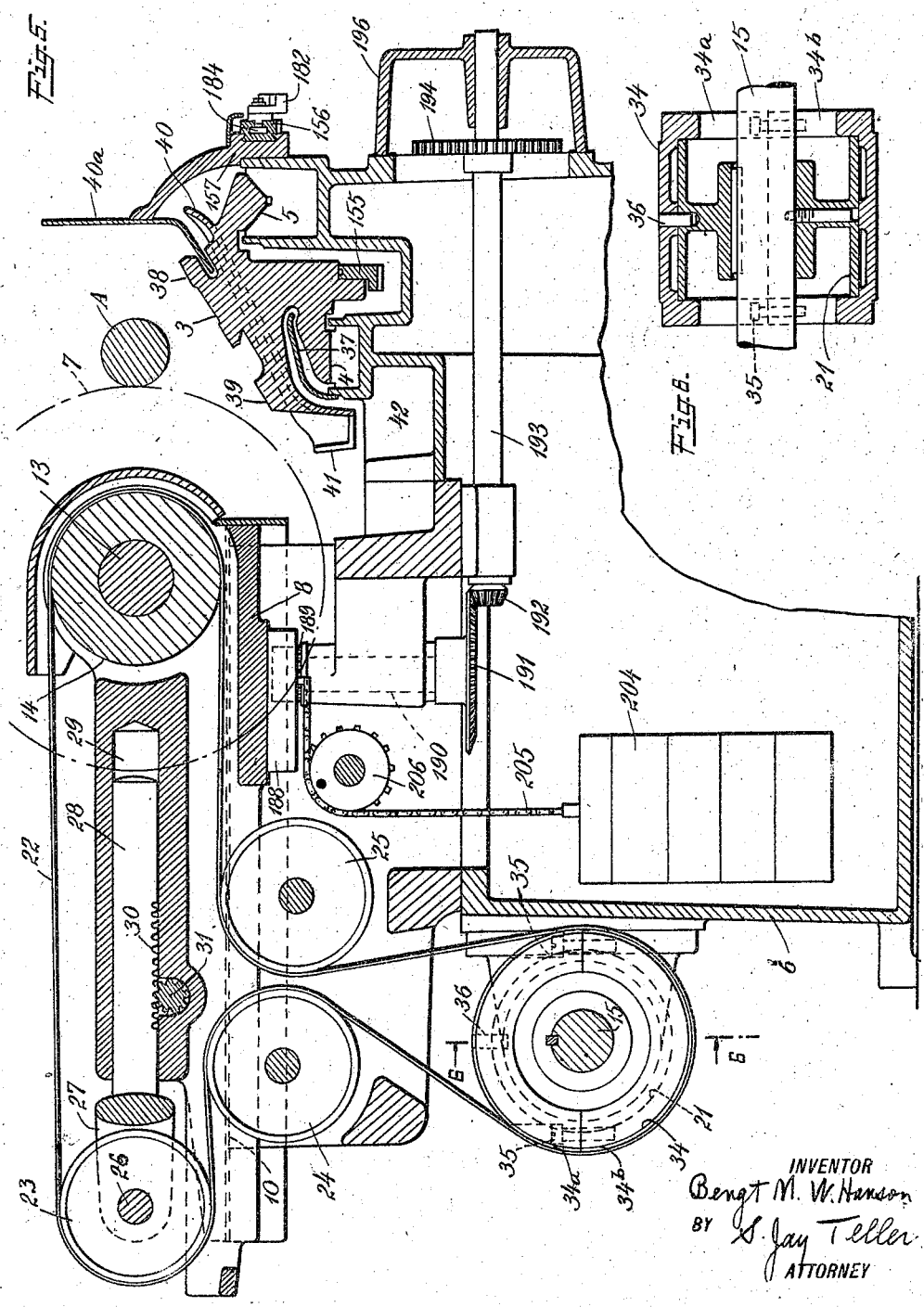

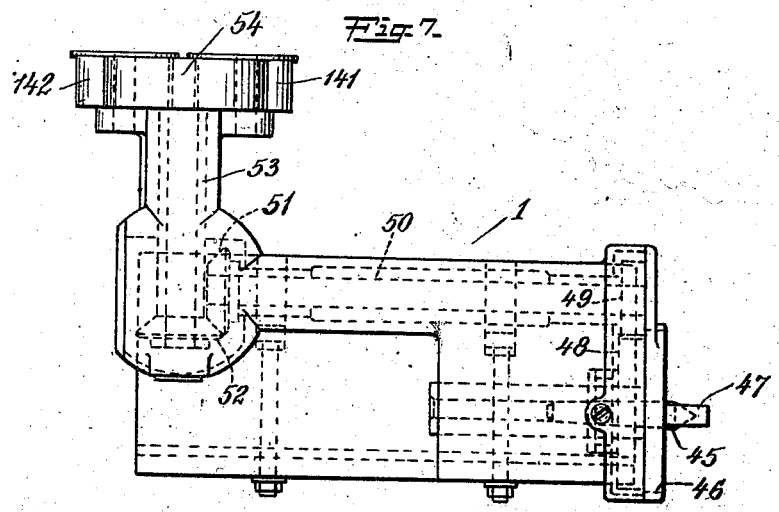
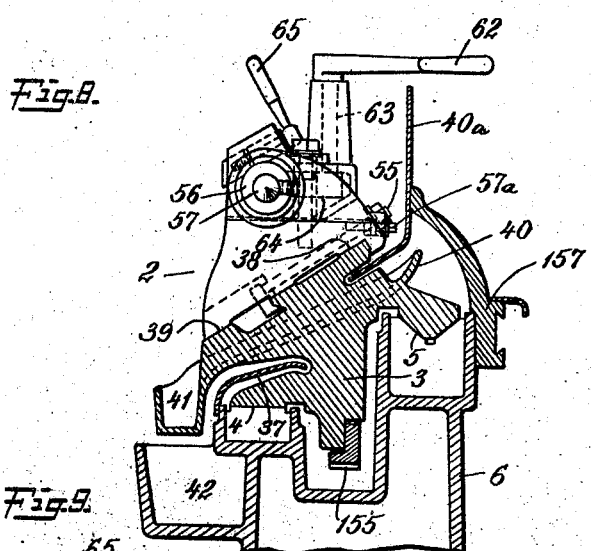
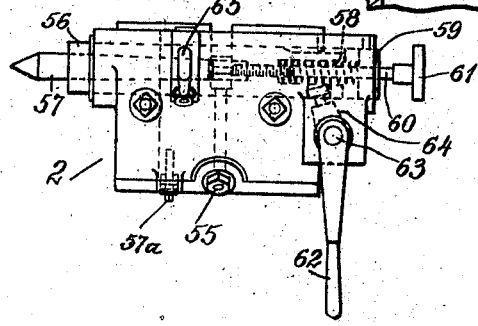

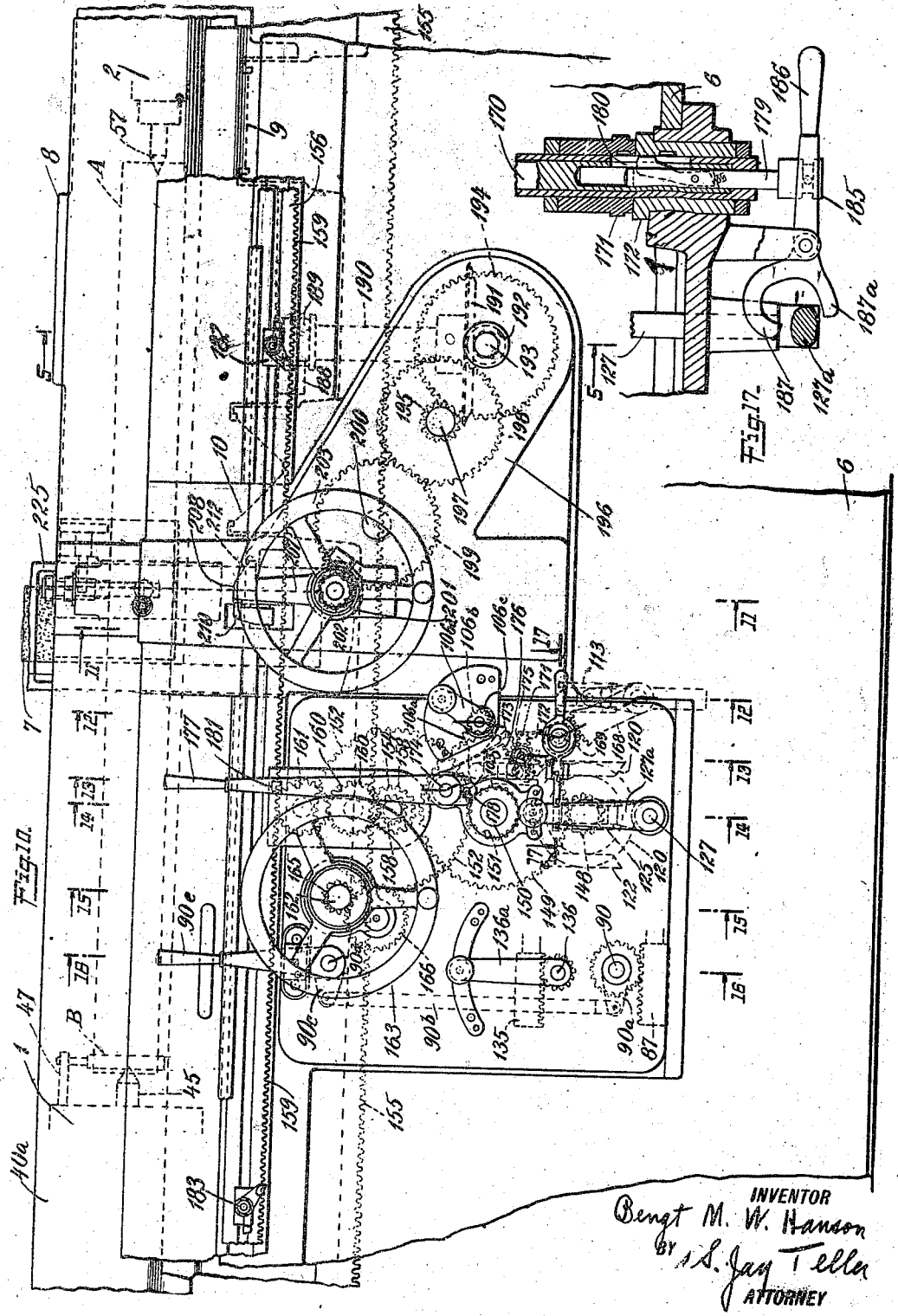

B. M. W. HANSON.
CYLINDRICAL GRINDING MACHINE.
APPLICATION FILED OCT. 7, 1918.
1,339,027.
Patented May 4, 1920.
12 SHEETS—SHEET 7.
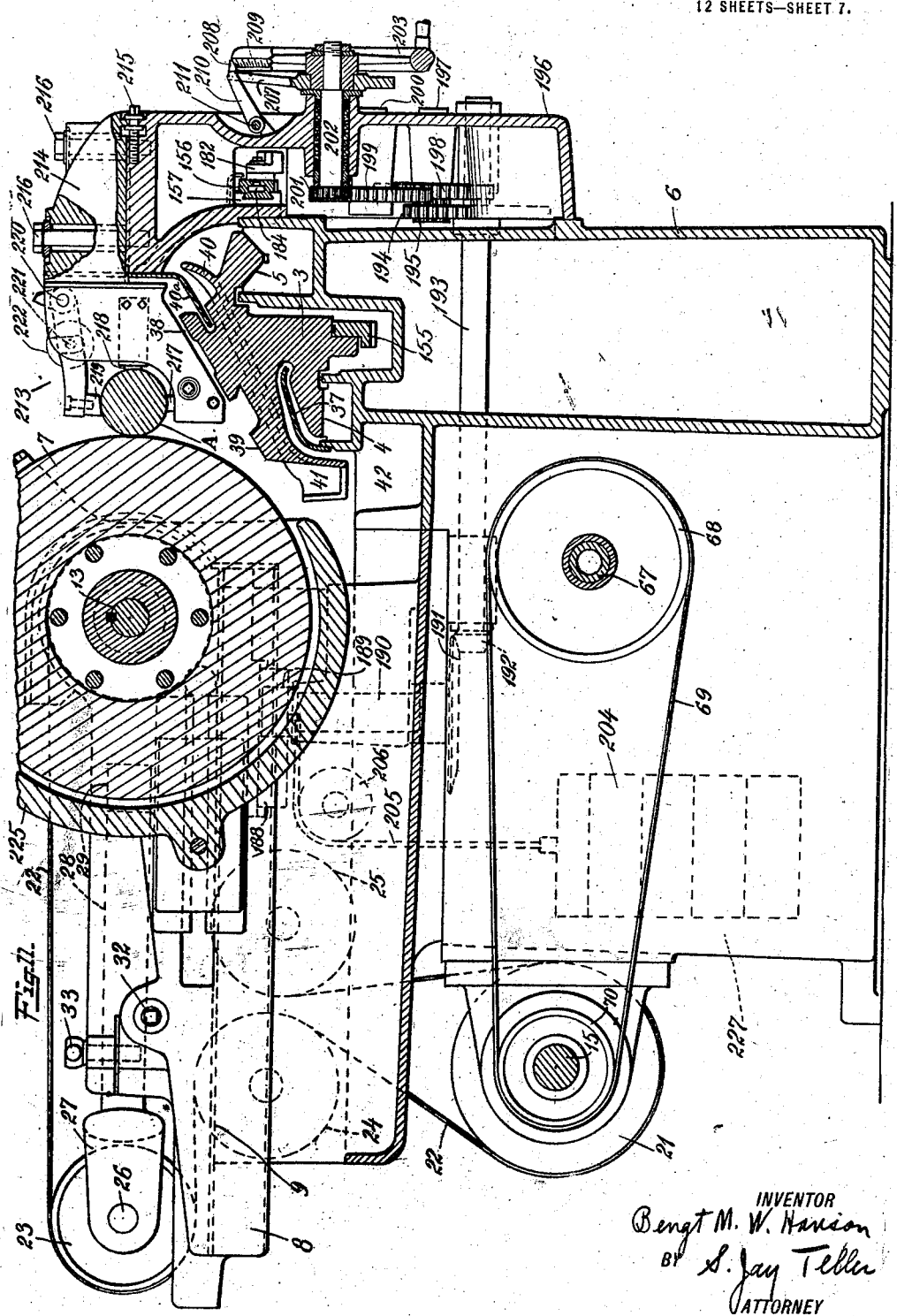
INVENTOR
Bengt M. W. Hanson
BY S. Jay Teller
ATTORNEY B. M. W. HANSON.
CYLINDRICAL GRINDING MACHINE.
APPLICATION FILED OCT. 7, 1918.
1,339,027.
Patented May 4, 1920.
12 SHEETS—SHEET 8.
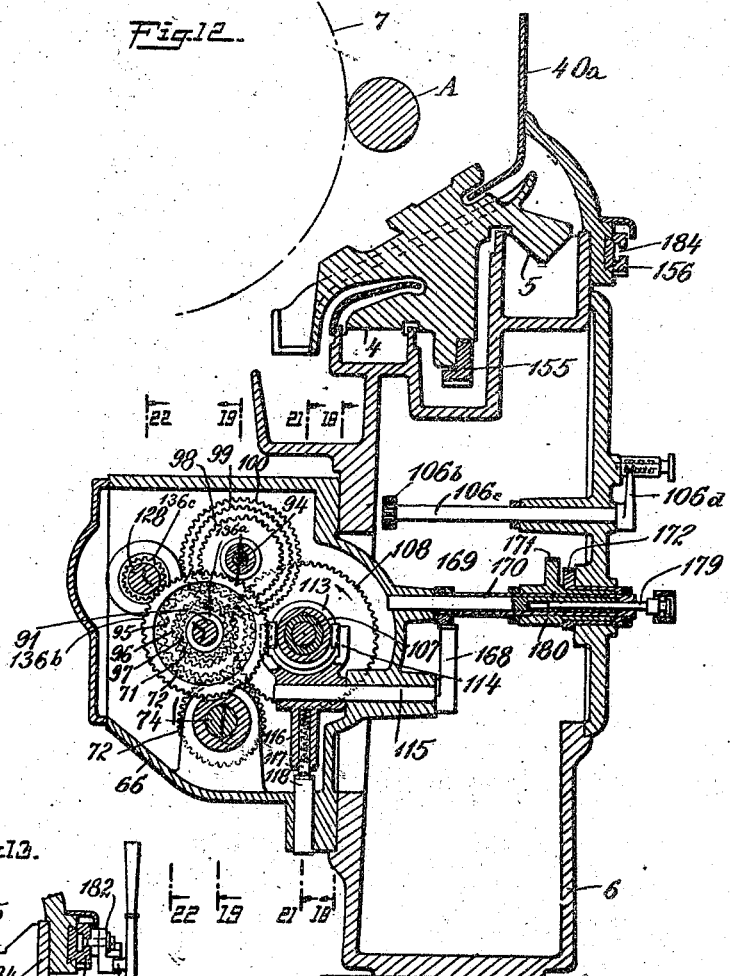
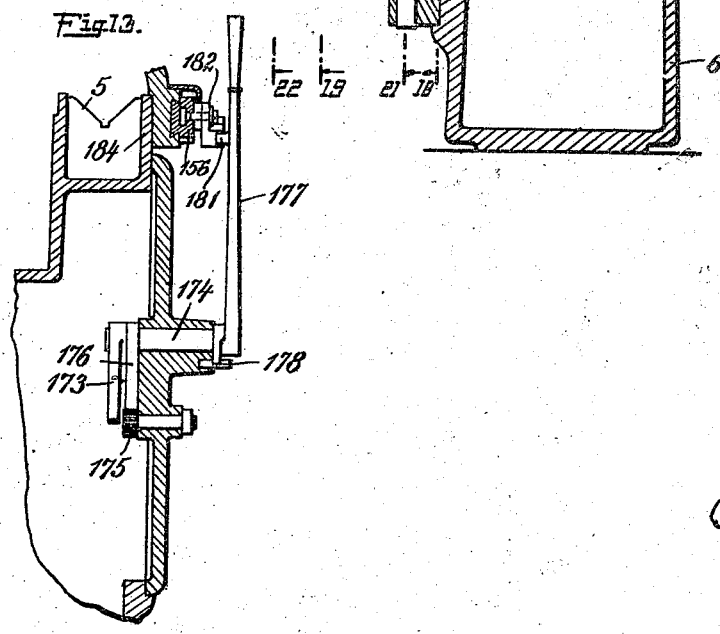
INVENTOR
Bengt M. W. Hanson
BY S. Jay Teller
ATTORNEY

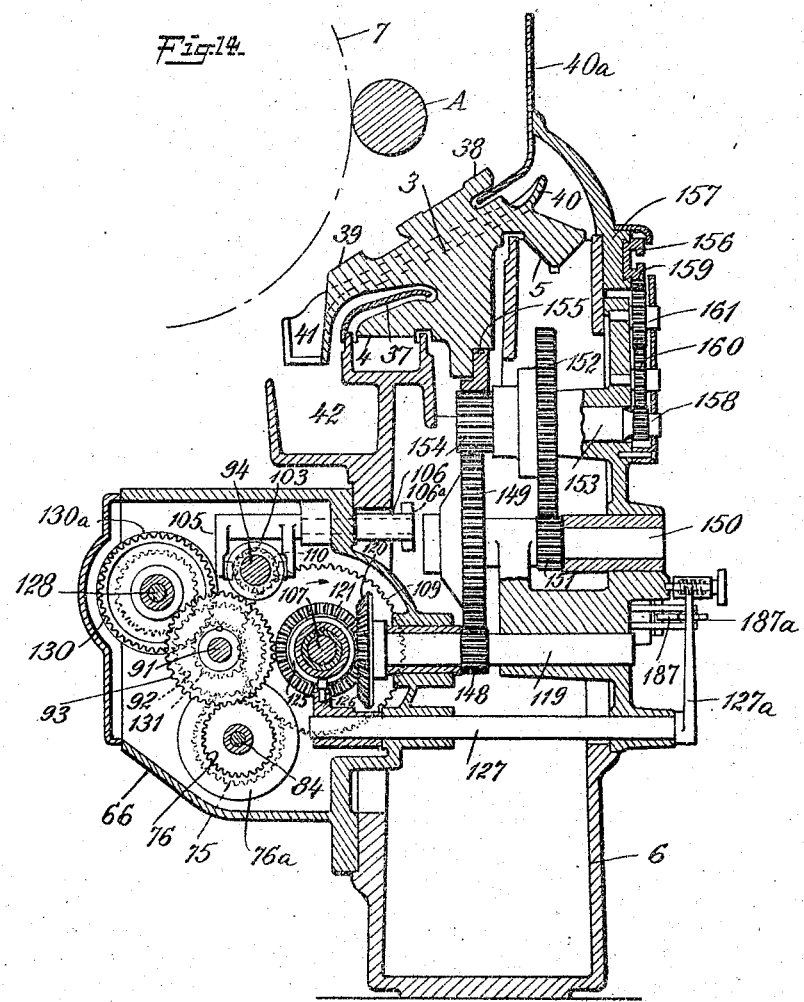

B. M. W. HANSON.
CYLINDRICAL GRINDING MACHINE.
APPLICATION FILED OCT. 7, 1918.

1,339,027.

Patented May 4, 1920.
12 SHEETS—SHEET 10.

INVENTOR
Bengt M. W. Hanson
BY S. Jay Teller
ATTORNEY

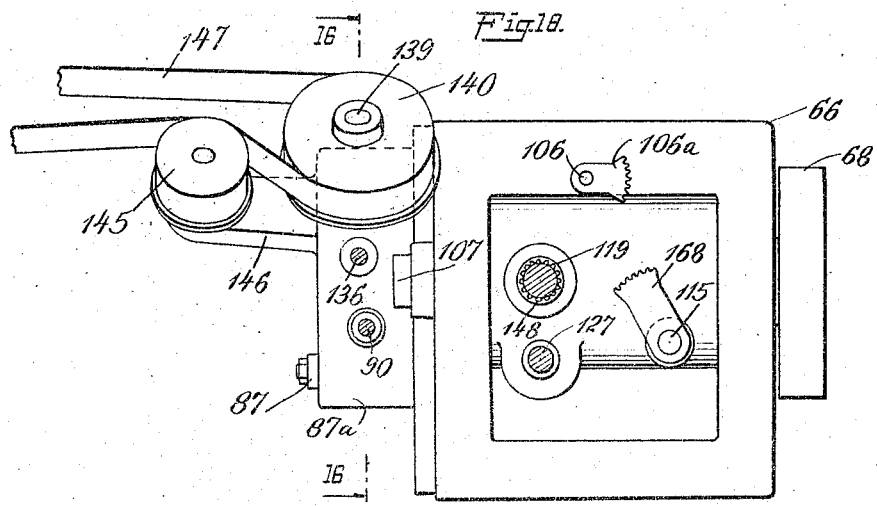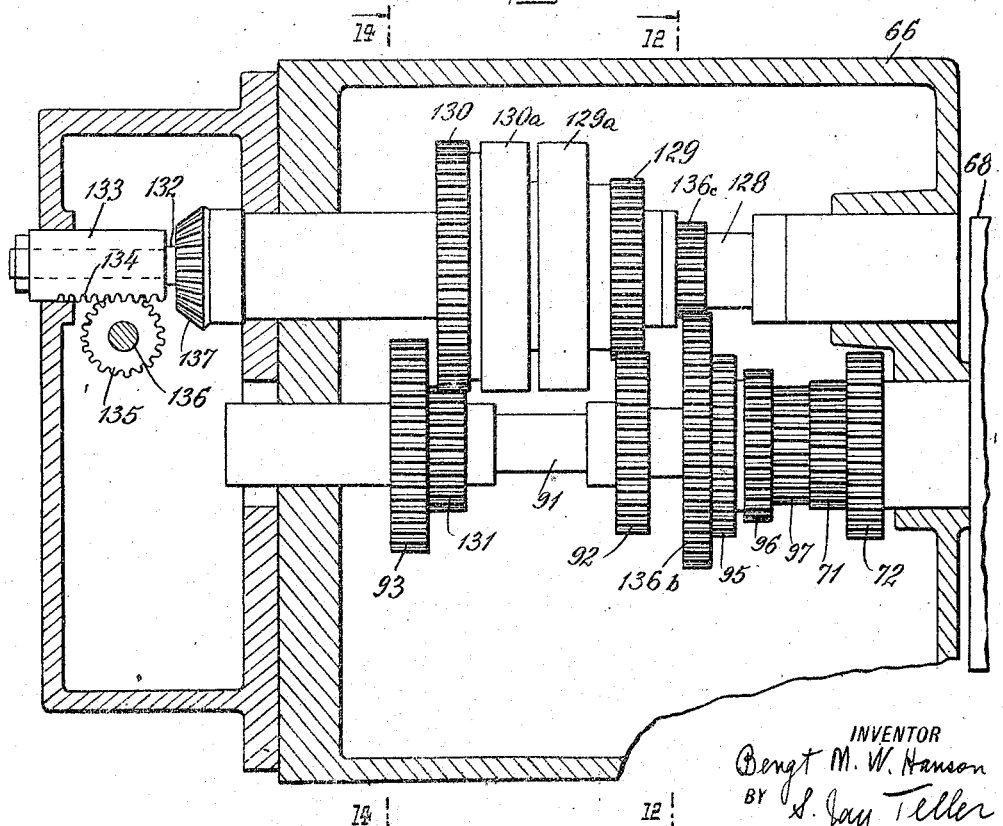

B. M. W. HANSON.
CYLINDRICAL GRINDING MACHINE.
APPLICATION FILED OCT. 7, 1918.
1,339,027.
Patented May 4, 1920.
12 SHEETS—SHEET 12.
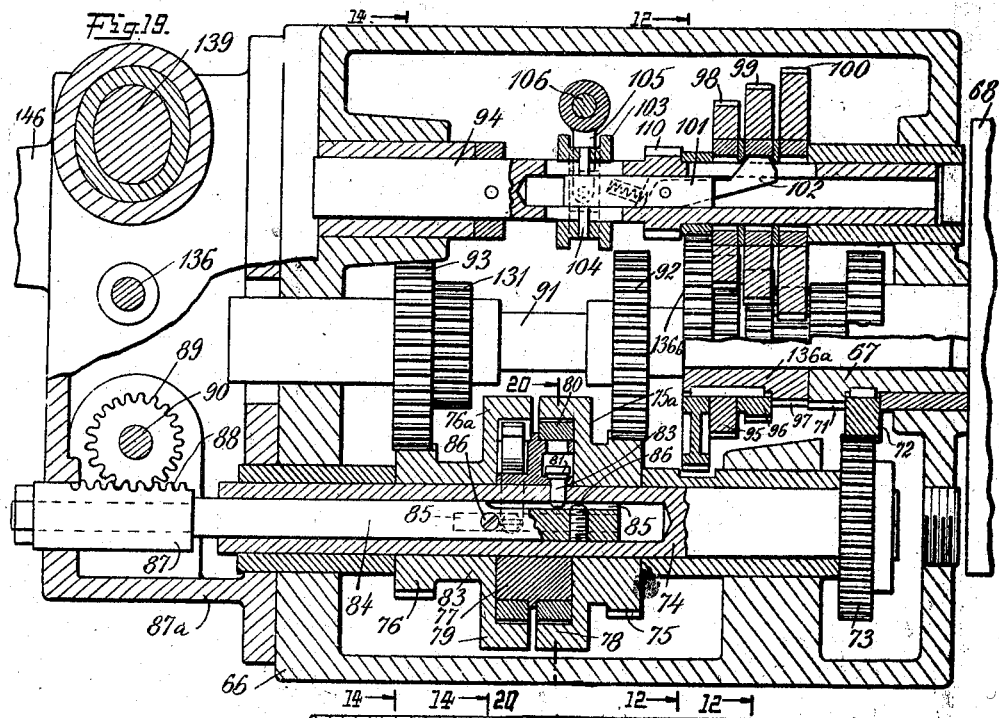
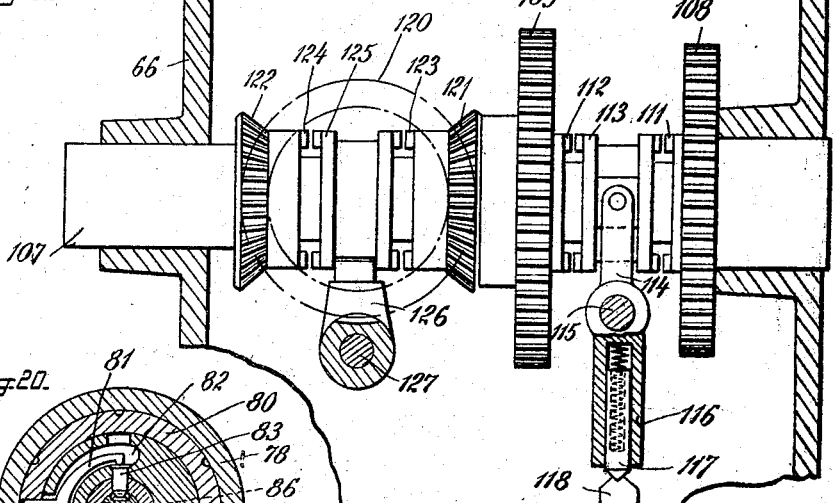
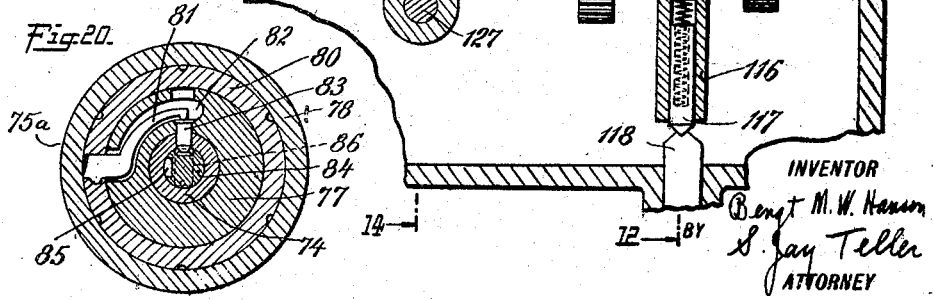
INVENTOR
Bengt M. W. Hanson
BY S. Jay Teller
ATTORNEY

UNITED STATES PATENT OFFICE.

BENGT M. W. HANSON, OF HARTFORD, CONNECTICUT, ASSIGNOR TO PRATT & WHITNEY COMPANY, OF NEW YORK, N. Y., A CORPORATION OF NEW JERSEY.

CYLINDRICAL GRINDING-MACHINE.

1,339,027.   Specification of Letters Patent.   Patented May 4, 1920.

Application filed October 7, 1918. Serial No. 257,282.

*To all whom it may concern:*

Be it known that I, BENGT M. W. HANSON, a citizen of the United States, residing at Hartford, in the county of Hartford and State of Connecticut, have invented certain new and useful Improvements in Cylindrical Grinding-Machines, of which the following is a specification.

A machine embodying the invention is particularly well adapted for the grinding of shafts, lead screws and other machine parts which are cylindrical in shape. The machine is not limited to the grinding of parts which are of the same diameter throughout but may be used in cases where there are two or more sections with different diameters. The invention is particularly applicable to a horizontal grinding machine and such term is used in the present specification to designate a machine of the type illustrated having a grinding wheel with a horizontal axis.

One of the objects of the invention is to provide a grinding machine which is adapted to accurately grind and size a shaft or similar part at a single operation. In accordance with the invention the grinding wheel, at a single relative passage along the shaft, completes the grinding operation and reduces the shaft to size. Another object of the invention is to provide improved means for supporting the work to be ground and for moving it relatively to the wheel. A further object of the invention is to provide improved means whereby the feeding of the work can be effected either toward the right or toward the left as required. A further object of the invention is to provide improved means for stopping the movement of the work support at the completion of grinding, this means being operable for either direction of feed. Further objects of the invention will be apparent from the following specification and claims.

In the accompanying drawings I have shown the embodiment of the invention which is now deemed preferable, but it will be understood that various modifications and substitutions of equivalents may be made without departing from the spirit of the invention as set forth in the claims appended to this specification.

Of the drawings:

Figure 1 is a front elevation of a machine embodying the invention.

Fig. 2 is a plan view.

Fig. 3 is a fragmentary end view on an enlarged scale taken from the left.

Fig. 4 is a fragmentary rear view on the same scale as Fig. 3.

Fig. 5 is a fragmentary transverse sectional view taken along the lines 5—5 of Figs. 4 and 10.

Fig. 6 is a fragmentary sectional view taken along the line 6—6 of Fig. 5.

Fig. 7 is a fragmentary view showing the headstock, the view being taken in the direction of the arrow 7 appearing in Fig. 3.

Fig. 8 is an end view of the tailstock taken from the left.

Fig. 9 is a plan view of the tailstock.

Fig. 10 is a fragmentary front view.

Fig. 11 is a transverse sectional view taken along the line 11—11 of Fig. 10.

Fig. 12 is a transverse sectional view taken along the lines 12—12 of Figs. 10, 19 and 21.

Fig. 13 is a transverse sectional view taken along the line 13—13 of Fig. 10.

Fig. 14 is a transverse sectional view taken along the lines 14—14 of Figs. 10, 19, 21 and 22.

Fig. 17 is a fragmentary horizontal view, partly in section along the line 17—17 of Fig. 10, showing in detail a part of the lever mechanism.

Fig. 18 is a view of the gear casing taken from the front along the line 18—18 of Fig. 12.

Fig. 19 is a sectional view through the gear casing taken along the line 19—19 of Fig. 12.

Fig. 20 is a fragmentary sectional view taken along the line 20—20 of Fig. 19.

Fig. 21 is a sectional view through the gear casing taken along the line 21—21 of Fig. 12.

Fig. 22 is a sectional view taken through the gear casing along the line 22—22 of Fig. 12.

Figure 16:
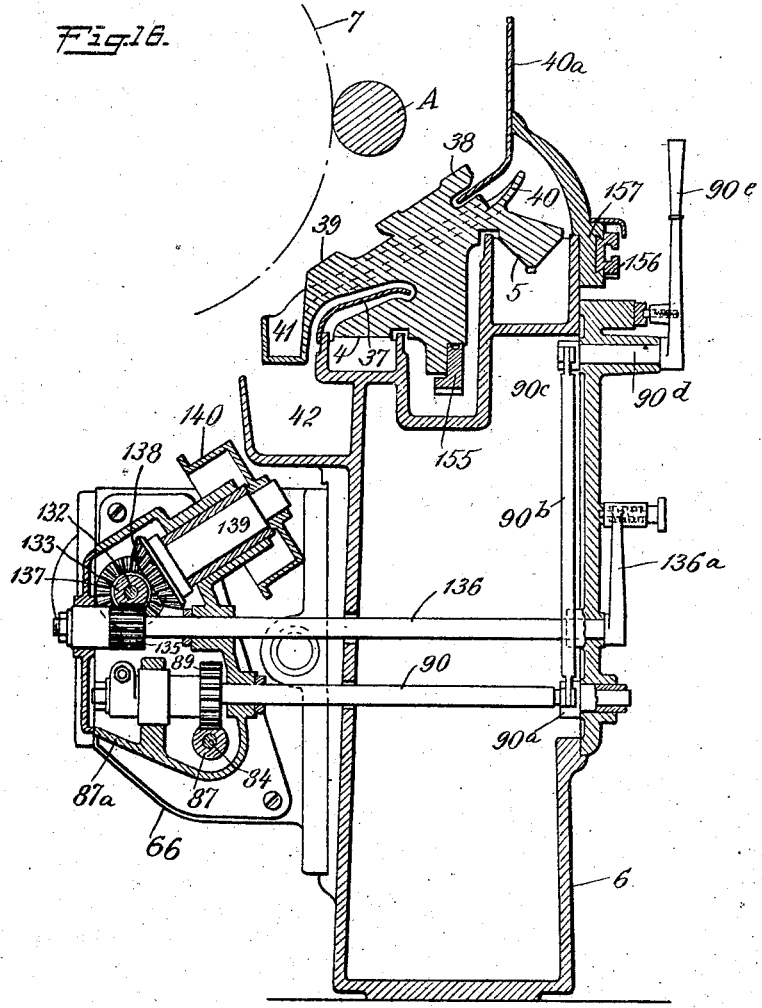
Fig. 16 is a transverse sectional view taken along the lines 16—16 of Figs. 10 and 18.

As has already been stated, the machine is primarily intended for the grinding of shafts, lead screws or other cylindrical bodies. For supporting the shaft or other piece to be ground, such as shown at A, there is provided a headstock 1 and a tailstock 2 having centers which engage the ends of the shaft. The grinding wheel is shown at 7 and is positioned with its axis of rotation parallel to the axis of the shaft. Means are provided whereby relative movement can be effected to bring the grinding wheel toward or away from the shaft. As shown, the wheel is mounted on a slide 8 which is movable forward and backward on ways formed on the main frame. Means are also provided whereby relative feeding movement can be effected longitudinally of the shaft and preferably, as shown, the shaft is moved and the wheel is held bodily stationary. In the preferred construction the headstock and the tailstock are adjustably secured to a table 3 which is adapted to be reciprocated longitudinally of the machine along ways 4 and 5 formed on the main frame 6. The shaft A is rotated by means of the headstock and at the same time the table 3 is reciprocated to cause the shaft to be moved past the grinding wheel. This combined rotative and longitudinal movement of the shaft causes its entire surface to be presented to the grinding wheel. A single longitudinal movement of the shaft completes the grinding operation.

Having briefly outlined the basic features and the essential steps of operation of the machine, I will now proceed to a detailed description of the several devices whereby the grinding wheel and the work are operated and controlled to effect grinding in a rapid, accurate and convenient manner.

The slide 8 which carries the grinding wheel is shown clearly in Figs. 2, 4, 5 and 11. As shown, the main frame 6 is provided with horizontal ways 9 and 10 which support the slide 8 and guide it for forward and backward movement. At its front end the slide is provided with bearings 11 and 12 in which is mounted a spindle 13 carrying the grinding wheel 7. Secured to the spindle between the bearings 11 and 12 is a belt wheel 14.

The main drive shaft of the machine is shown at 15 (Figs. 2 and 4), being mounted in bearings 16 and 17 carried by the main frame 6. Power may be supplied to the main drive shaft 15 in any usual or preferred manner, but in the drawings, for the sake of illustration, I have shown an electric motor 18 mounted with its drive shaft in alinement with the shaft 15. Preferably, there is a flexible coupling 19 between the drive shaft of the motor and the shaft 15, this coupling being positioned in a housing 20 supported on the main frame. The main shaft 15 carries a belt wheel 21 which is positioned with its central plane coincident with the central plane of the aforesaid belt wheel 14 on the spindle 13.

A belt 22 passes around these two belt wheels and also around idler pulleys 23, 24 and 25 (Fig. 11). The pulleys 24 and 25 are mounted in fixed positions on the main frame and the pulley 23 is carried by the slide 8. The pulley 23 can be moved forward and backward on the slide to tighten or loosen the belt 22 as required. Preferably the pulley belt 22 as required. Preferably the pulley is supported on a spindle 26 carried by a yoke 27 formed at the rear of a bar 28. This bar is slidably mounted in an aperture 29 formed in the body of the slide and is provided with rack teeth 30 which mesh with the teeth of a pinion 31. This pinion is mounted on a short longitudinal shaft 32 which has a squared end by means of which it may be turned. Obviously, by turning the shaft and the pinion, the pulley 23 can be moved rearward or forward to tighten or loosen the belt as may be required. The pulley is locked in adjusted position by means of a screw 33 which serves to clamp the bar 28. It will be clear that after adjustment the pulley 23 is movable forward and backward bodily with the wheel 14 and with the grinding wheel whenever the slide 8 is moved. The positions of the idler pulleys 24 and 25 are such as to permit such forward and backward movement without changing the belt tension.

In order that the speed of the grinding wheel may be changed with respect to the speed of the drive shaft 15, I provide one or more bushings 34 any one of which may be applied to the wheel 21 to increase the effective diameter thereof. Such a bushing has been shown in place and is illustrated in detail in Fig. 6. As shown, the bushing comprises two half-sections 34$^a$ and 34$^b$ which are clamped into engagement with the wheel by means of screws 35, 35. Preferably a pin 36 serves to positively prevent relative rotative movement between the sleeve and the wheel. It will be clear that by putting on or taking off the sleeve or by substituting one sleeve for another of different diameter the effective diameter of the drive wheel 21 can be varied, thus changing the relative speed of the grinding wheel. The idler pulley 23 can be adjusted to compensate for changes in the length of the path of the belt around the wheel 21.

As already stated, the table 3 is slidable along longitudinal ways 4 and 5 formed on the main frame 6. Preferably, as shown, the front or outer way 5 is at an elevation considerably above that of the rear or inner way 4. A guard 37 is secured to the main frame and extends longitudinally of the way 4 to protect the bearing surfaces and prevent water or debris from having access thereto. The table 3 is provided with longitudinal ways 38 and 39 which are engaged by the aforesaid headstock 1 and tailstock 2. The ways 38 and 39 are transversely inclined, as shown, sloping downward toward the rear. Preferably the table 3 is provided with a flange 40 which extends throughout the entire length and downward at both ends and forms a trough for collecting water and guiding it toward the rear. This trough ends in spouts 41 which discharge into a relatively large gutter 42 extending longitudinally of the main frame. Coöperating with the flange 40 is a guard 40ª which is mounted on brackets extending upward from the main frame and which serves to prevent the escape of water toward the front and which serves to guide the water downward into the trough which is formed by the flange 40.

The main body casting of the headstock 1 is formed to fit the ways 38 and 39, as shown in Fig. 3. The headstock is adjustable longitudinally along the ways and can be clamped in adjusted position by means of the bolts 43 having heads 44 adapted to engage the inner side of the way 38. Secured to the main frame of the headstock is a center 45 which is nonrotative (Fig. 7). Surrounding the center and rotatable about the axis thereof is a ring 46 carrying a pin 47. This pin is adapted to engage a dog B secured to the work for the purpose of driving it. Rigidly connected with the ring 46 is a spur gear 48 which meshes with a pinion 49 on a shaft 50 extending longitudinally of the headstock and mounted in suitable bearings therein. At the other end the shaft 50 carries a bevel gear 51 which meshes with a bevel gear 52. This bevel gear 52 is secured to a shaft 53 which is carried by the headstock and which extends diagonally downward toward the rear. At the lower rear end of the shaft 53 is a belt pulley 54 and it will be clear that when this belt pulley is turned power is transmitted through the devices described to rotate the ring 46 and thus through the pin 47 rotate the work. The means for rotating the wheel 54 will be described hereinafter.

The body part of the tailstock 2 is also formed to fit the ways 38 and 39. Bolts 55 similar to the bolts 43 are provided for clamping the tailstock in position after adjustment. Longitudinally slidable in the body of the tailstock is a sleeve 56 carrying a center 57 in alinement with the headstock center 45. Preferably the tailstock body is formed in two parts as shown. The upper part which carries the sleeve 56 is transversely adjustable on the lower part by means of the screw 57ª. This construction permits the center 57 to be accurately alined with the center 45. A spring 58 is provided for normally pressing the sleeve 56 with the center 57 toward the left, this spring abutting at its right-hand end against a plug 59. Preferably a rod 60 extends through the plug 59 and has threaded engagement with the sleeve. By means of a knob 61 this rod may be turned and used to eject the center when required. The spring 58 normally serves to push the sleeve toward the left, and for moving the sleeve toward the right there is provided a pivoted hand lever 62. This hand lever is mounted at the upper end of a vertical shaft 63 and at its lower end the shaft carries an arm 64 which at its end is seated in an aperture of the sleeve. It will be seen that by turning the lever 62 the bushing 56 may be drawn backward against the pressure of the spring. The bushing 56 may be secured in adjusted position by means of the clamping lever 65.

When the shaft or other piece of work is to be mounted in the machine, the headstock and tailstock are relatively adjusted in accordance with the length of the shaft. Then the shaft is provided with a dog B adapted to engage the pin 47; the dogged end of the shaft is engaged with the center 45; the center 57 is withdrawn by means of the lever 62 and is then permitted to move into engagement with the other end of the shaft under the action of the spring 58. This insures a correct predetermined pressure at the centers. After the centers are thus engaged with the shaft the tailstock center is locked by means of the lever 65.

Power for reciprocating the table, for rotating the work, for feeding the wheel and for other purposes is transmitted through a gear mechanism which is contained in a housing 66 secured to the main frame, as shown in Figs. 3, 12, 14 and 16. At the right-hand end of the gear casing 66, as shown in Fig. 19, there projects a drive sleeve 67 carrying a belt wheel 68. A belt 69 passes over the wheel 68 and also over a belt wheel 70 on the main drive shaft 15.

The drive sleeve 67 is rotatably mounted in a bearing in the gear casing and at its inner end carries two spur gears 71 and 72. The gear 72 meshes with a gear 73 on a horizontal shaft 74 rotatably mounted in bearings in the casing. Independently rotatably mounted on the shaft 74 are two differently diametered spur gears 75 and 76. Associated respectively with the gears 75 and 76 are clutches 75ª and 76ª by means of which either of the gears may be operatively connected with the shaft. Rigidly connected with the shaft is a hub 77 and connected respectively with the gears are annular flanges 78 and 79 which extend over and partly inclose the hub. As shown more clearly in Fig. 20, an expansible split ring 80 is located in the space between the hub 77 and each of the flanges, as for instance the flange 78. A knuckle lever 81 is positioned within a slot 82 formed in the hub and the end portion of the lever extends into the space between the ends of the ring. Mounted in a radial aperture in the hub 77 is a plunger 83 adapted to engage the lever 81 to move it in such a manner as to expand the ring into frictional engagement with the flange 78, thus clutching the flange together with the attached gear to the shaft. The shaft 74 is provided with a longitudinal central aperture in which is slidably mounted a rod 84, this rod having longitudinal grooves 85 into which project the beveled ends of screws 86. The plungers 83 extend respectively into the aforesaid grooves 85 and are beveled at their ends and adapted to be engaged respectively by the ends of the screws 86 when the rod is moved longitudinally. As shown, the rod 84 is in its central or neutral position, but it will be clear that by moving the rod in one direction or the other either of the screws 86 may be engaged with the corresponding plunger 83 to expand the corresponding ring and clutch the corresponding gear to the shaft. For moving the rod 84 longitudinally there is provided a non-rotatable sleeve 87 to which the rod 84 is so connected as to be longitudinally movable therewith. The sleeve 87 is preferably positioned within a supplemental casing or housing $87^a$ which is secured to the main gear casing 66. The sleeve 87 has rack teeth at 88 which mesh with the teeth of a pinion 89 mounted on a transverse shaft 90. The shaft 90 has bearings in the housing $87^a$ and also in the main frame 6, as shown in Fig. 16. The shaft 90 near its front end is provided with an arm $90^a$ to which is pivotally connected a vertical link $90^b$. The upper end of the link $90^b$ is connected with an arm $90^c$ mounted on a rock shaft $90^d$. Connected to the rock shaft is a hand lever $90^e$ (Figs. 10 and 16). The hand lever carries a spring-pressed plunger which is adapted to coöperate with an apertured plate to yieldably hold the hand lever in any one of three operative positions. By means of devices which have been described, the shaft 90 can be turned in one direction or the other to cause the connection of either of the gears 75 or 76 to the shaft 84.

Also rotatably mounted in the gear casing 66 is a horizontal shaft 91 which is in alinement with the drive sleeve 67. Preferably, as shown, this shaft extends into the sleeve and has a bearing therein. Rigidly secured to the shaft 91 are two spur gears 92 and 93 which are of different diameters and which are in mesh respectively with the aforesaid gears 75 and 76 on the shaft 74. It will be seen that by means of these gears the shaft 91 may receive power from the drive sleeve 67 and may be rotated at either of two speeds in accordance with which one of the gears 75 and 76 is connected with the shaft 74.

A horizontal shaft 94 is rotatably mounted in bearings in the gear casing and is connected with the shaft 91 by means of a set of change-speed gears. As illustrated, there are three differently diametered gears 95, 96 and 97 mounted on the shaft 91 and meshing respectively with differently diametered gears 98, 99 and 100 loosely mounted on the shaft 94. The shaft 94 is provided with a central aperture in which is slidably mounted a rod 101. Pivoted to the rod near its end is a key 102 which extends through a slot in the shaft and is adapted to engage a keyway in any of the gears 98, 99 or 100. Slidably mounted on the shaft 94 is a grooved collar 103 which is connected with the rod 101 by means of a pin 104 extending through slots in the shaft. A forked lever 105 has projections engaging the groove of the collar 103 and is mounted on a transverse horizontal rock shaft 106, shown in Fig. 14. This rock shaft carries at its front end a gear segment $106^a$ which meshes with a pinion $106^b$ mounted on the rear end of a transverse horizontal shaft $106^c$ which is carried by a bearing in the main frame. At the front end of the shaft $106^c$ is a hand lever $106^d$ which is provided with a spring-pressed plunger adapted to coöperate with holes in the main frame to hold the lever in any one of three operative positions. By properly moving the rock shaft by means of the hand lever $106^d$, the key 102 may be moved to engage any one of the gears 98, 99 or 100. By means of this mechanism the shaft 94 may be driven from the shaft 91 at any one of three relative speeds.

A fourth horizontal shaft 107 is rotatably mounted in bearings near the front of the casing 66, this shaft with the parts carried thereby being particularly clearly shown in Fig. 21. Rotatably mounted on the shaft 107 are two spur gears 108 and 109 adapted respectively to mesh with the aforesaid said gear 71 on the drive sleeve 67 and with a gear 110 rigidly mounted on the shaft 94. Formed respectively on the gears 108, 109 are sets of clutch teeth 111 and 112 adapted respectively to mesh with clutch teeth on a grooved clutch collar 113 which is splined on the shaft 107. For moving the clutch collar 113 there is provided a forked lever 114 mounted on a transverse horizontal rock shaft 115 having a bearing in the gear casing, as shown in Fig. 12. Extending downward from the forked lever 114 is a projection 116 having a spring-pressed pointed plunger 117. This plunger is adapted to coöperate with a notched finger 118 projecting upward from the bottom of the gear casing. The pressure of the plunger against the finger serves to hold the forked lever 114 together with the clutch collar either in the central neutral position, as shown, or in either one of the operative positions. The inclined sides of the notch serve to insure the complete disengagement of the clutch when it is operated either manually or automatically in the manner to be described. It will be clear than when the clutch collar is in neutral position both of the gears 108 and 109 will be disconnected from the shaft, which will not be rotated. By moving the clutch collar in one direction or the other, either of the gears may be operatively connected with the shaft. By referring to Figs. 12 and 14 it will be noted that the gear 108, which is driven directly from the drive sleeve, is rotated in the counter-clockwise direction, whereas the gear 109, which is driven indirectly through the clutches and the change-speed gearing, is rotated in the clockwise direction. It will therefore be understood that by shifting the clutch element 113 the shaft 107 may be maintained idle or may be rotated in either direction.

Mounted in one bearing in the main frame and in another bearing in the gear casing is a transverse horizontal shaft 119 which is at the same level as the shaft 107, as shown in Fig. 14. This shaft 119 carries at its inner end a bevel gear 120 which meshes with bevel pinions 121 and 122 relatively rotatably mounted on the shaft 107. These bevel pinions are provided respectively with sets of clutch teeth 123 and 124 which are adapted to mesh respectively with sets of clutch teeth formed on a grooved collar 125. This collar is splined to the shaft 107. For moving the clutch collar 125 there is provided an operating lever 126 which is secured to and projects upward from a transverse horizontal rock shaft 127 mounted in bearings in the main frame. Secured to the rock shaft 127 at its front end is a hand lever 127$^a$ by means of which the shaft can be turned. The hand lever carries a spring-pressed plunger adapted to coöperate with holes in the frame to hold the lever in any one of three operative positions. When the clutch collar 125 is in its central neutral position, as shown, the shaft 119 is disconnected from the shaft 107. However, by moving the clutch collar 125 in one direction or the other by means of the hand lever 127$^a$ the shaft 119 may be operatively connected to the shaft 107 to be driven in either direction with respect thereto.

As shown most clearly in Fig. 22, a fifth horizontal shaft 128 is mounted in bearings in the gear casing 66. Loosely mounted on this shaft are differently diametered spur gears 129 and 130 which mesh respectively with the aforesaid gear 92 on the shaft 91 and with a gear 131 also mounted on the shaft 91. Connected respectively with the gears 129 and 130 are clutches 129$^a$ and 130$^a$ which are similar in all respects to the clutches 75$^a$ and 76$^a$ already described in connection with the gears 75 and 76. Repetition of the description will be unnecessary.

These clutches are controlled by means of a rod 132 slidable in an aperture in the shaft 128. A non-rotatable sleeve 133 is provided to which the rod 132 is connected for longitudinal movement. This sleeve 133 has rack teeth 134 which mesh with the teeth of a pinion 135. This pinion is secured to a transverse horizontal rock shaft 136 mounted in bearings in the housing 87$^a$. Secured to the front end of the shaft 136 is a hand lever 136$^a$, shown in Fig. 10. This hand lever is provided with a spring-pressed plunger adapted to coöperate with holes in the main frame whereby the lever may be locked in any one of three operative positions. By means of the hand lever 136$^a$ either of the gears 129 or 130 may be connected with the shaft 128 to drive it from the shaft 91 at either of two relative speeds.

It will be seen that the two sets of clutches that I have described make it possible for the shaft 128 to be driven at any one of four speeds. The clutches 75$^a$ and 76$^a$ provide two speeds for the shaft 91 and the clutches 129$^a$ and 130$^a$ provide two speeds for the shaft 128 for each of the speeds of the shaft 91.

Preferably the aforesaid gears 95, 96 and 97 are not rigidly secured to the shaft 91 but are secured to a sleeve 136$^a$ which is rotatable on the shaft. Also secured to the sleeve 136$^a$ is a spur gear 136$^b$ which meshes with a pinion 136$^c$ on the shaft 128. This construction enables the gears 95, 96 and 97 to be driven at any one of four speeds corresponding to the speeds of the shaft 128.

Secured to the left-hand end of the shaft 128 is a bevel gear 137 which meshes with a bevel gear 138 on a shaft 139 (Fig. 16). This shaft 139 is mounted in a bearing in the housing 87$^a$ and is positioned with its axis in a transverse vertical plane, but the shaft is inclined upward and forward preferably at an angle of a little less than 45°, as shown in Fig. 16. At the upper forward end of the shaft there is mounted a belt pulley 140.

As has already been pointed out, the headstock is provided with a rotatable drive shaft 53 which is inclined downward toward the rear and which carries a belt wheel 54. The inclination of the shaft 53 is the same as that of the shaft 139 above referred to. Carried by the headstock at each side of and below the belt wheel 54 are two idler belt pulleys 141 and 142 having their axes parallel to the axes of the belt wheels 54 and 140. Carried by a bracket 143 at the left-hand end of the main frame is an idler pulley 144 having its axis parallel to the axes of the wheels and pulleys before referred to. Preferably there is also an idler pulley 145 carried by the bracket 146 on the housing 87$^a$, the axis of this pulley also being parallel to the axes of the other wheels and pulleys. An endless belt 147 passes over and around the several wheels and pulleys, as shown in Fig. 1. Power is supplied to the belt by means of the drive wheel 140 and power is taken from the belt by means of the belt wheel 54 from which it is transmitted to the headstock and to the work in the way already described. It will be clear that the arrangement of the belt is such that the headstock may be moved longitudinally with the table without interfering in any way with the transmission of power. By properly manipulating the several clutches by means of levers 90$^e$ and 136$^a$, the headstock may be operated at any one of four speeds or it may be entirely disconnected from the drive mechanism and allowed to be idle.

As has already been stated, the table 3, which carries the headstock and the tailstock, is longitudinally movable along the ways 4 and 5 on the main frame. The mechanism for effecting this longitudinal movement of the table will now be described. Mounted on the aforesaid transverse horizontal shaft 119, as shown in Fig. 14, is a spur pinion 148 which meshes with a spur gear 149 mounted on a transverse horizontal shaft 150. The shaft 150 is mounted in bearings in the main frame and carries a spur pinion 151. This pinion meshes with a spur gear 152 on a transverse horizontal shaft 153 mounted in a bearing in the main frame. The shaft 153 carries at its rear end a spur pinion 154 which meshes with a rack 155 secured to and extending longitudinally of the table 3. It will be clear that by means of this gearing the shaft 119, when rotated, serves to move the table.

It will be noted that the change-speed gears 95—100 are driven from the shaft 91, which also drives the headstock. Therefore the speed of table travel and the speed of headstock rotation are changed simultaneously and proportionately whenever the levers 90$^e$ and 136$^a$ are adjusted. However, by means of the change-speed gearing the speed of table travel can be varied independently of the speed of headstock rotation.

Preferably, for a purpose which will more clearly appear later, there is provided a sliding bar 156 which extends longitudinally of the machine and which is movably mounted in longitudinal ways formed in a casting 157 carried by the main frame. This bar 156 must be moved horizontally with the table 3 and at the same or at least a proportionate speed. In order that this may be done, the aforesaid shaft 153 is provided with a pinion 158 and the bar 156 is provided with rack teeth 159. Interposed between the pinion and the rack teeth are two idler gears 160 and 161 which are mounted on studs carried by the main frame. By means of these gears motion is transmitted from the shaft 153 to the bar 156 which is moved horizontally with the table 3 and in the same direction. The rate of movement, however, is somewhat less and therefore the bar 156 moves through a somewhat smaller distance than does the table.

Figure 15:
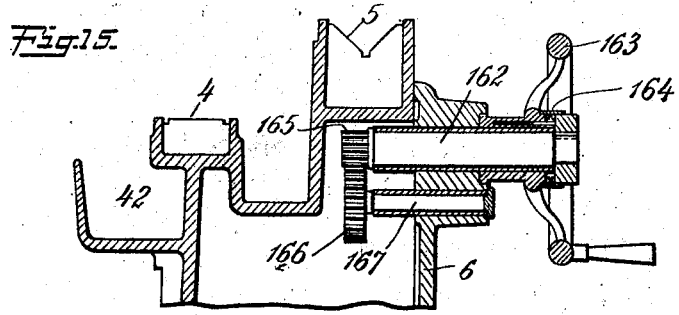
Fig. 15 is a fragmentary transverse sectional view taken along the line 15—15 of Fig. 10.

As shown in Fig. 15 there is mounted in the front of the main frame a transverse rotatable shaft 162 upon the outer end of which there is carried a hand wheel 163. The hand wheel is rotatable on the shaft but at 164 there are provided clutch teeth by means of which the hand wheel can be connected to the shaft when moved outward. At the inner end of the shaft is a pinion 165 which meshes with an idler gear 166 mounted on a stud shaft 167. The gear 166 meshes with the aforesaid gear 152. It will be seen that by means of the hand wheel 163 the table can be traversed manually when the power is disconnected.

As already stated, the clutch at 113 may be used to reverse the direction of movement of the shaft 107 and this clutch therefore serves to reverse the direction of movement of the shaft 119 and the direction of movement of the table 3 which is driven by the shaft 119. The clutch 113 may be operated manually but I also preferably provide means whereby it may be operated automatically by power.

Secured to the front end of the shaft 115 is a gear segment 168 (Fig. 12), the teeth of which mesh with a segment 169 on a transverse horizontal shaft 170. Loosely mounted on the shaft 170 are gear segments 171 and 172 (Fig. 17). The gear segment 171 meshes with a gear segment 173 (Fig. 13) rigidly secured to a rock shaft 174. The gear segment 172 meshes with an idler pinion 175 which in turn meshes with a gear segment 176 also rigidly secured to the rock shaft 174. The rock shaft 174 carries at its front end a lever 177 which is adapted to be operated manually. A pin 178 is adapted to engage lugs carried by the lever to limit the oscillation thereof. Suitable means are provided for operatively connecting either the gear segment 171 or the gear segment 172 with the rock shaft 170. As shown in Fig. 17, the shaft 170 is provided with a central longitudinal aperture through which extends a rod 179. This rod carries a key 180 which projects through a slot in the shaft and is adapted to engage a keyway either in the gear segment 171 or in the gear segment 172. By moving the rod 179 inward or outward, either of the segments may be connected with the shaft. It will be clear that the several gear segments together with the idler pinion constitute a reversing mechanism so that a movement of the rock shaft 170 in either desired direction can be obtained by a given movement of the lever 177 simply by properly adjusting the rod 179 to connect either the segment 171 or the segment 172.

As shown in Fig. 13, the lever 177 is provided with a lug 181 which is adapted to be engaged by dogs 182 and 183 carried by the aforesaid movable bar 156. This bar is provided with a longitudinal T-slot 184 by means of which the dogs can be secured to the bar in any desired position. It will be recalled that the movement of the bar 156 is exactly proportionate to that of the table, and it is therefore possible to so adjust the dog 182 that it will engage the lug on the lever immediately after the work A has passed the wheel when moving toward the left. The resultant movement of the lever serves to stop the table movement. The dog 183 may be so adjusted as to engage the lug on the lever as soon as the work A has passed the wheel when moving toward the right, thus again stopping the table.

From the description which has been given, it will be clear that the speed of the shaft 107 and of all of the parts driven thereby, including the table 3, is fixed when power is transmitted through the gear 108. However, when power is transmitted through the gear 109 the speed may be adjusted by means of the gearing 95—100 and by means of the several clutches. The speed of the shaft when driven through this gearing is considerably less than when driven directly from the drive sleeve 67. Ordinarily it is desired to make use of the change-speed gearing for driving the table slowly during grinding and to make use of the rapid direct drive during the return movement of the table. In accordance with varying conditions it is sometimes preferred to effect grinding while the table is moving from left to right and at other times to effect grinding while the table is moving from right to left. The adjustment to permit grinding in either direction, as required, is effected by means of the lever 127$^a$ which serves to reverse the direction of rotation of the shaft 119 with respect to the direction of rotation of the shaft 107.

It will be obvious that, when the direction of rotation of the shaft 119 is relatively changed by means of the clutch 125, it will be necessary to reverse the movement of the clutch 113 at the time of table reversal. Inasmuch as the same dogs 182 and 183 are to be used, notwithstanding the position of the clutch 125, it is necessary to interpose a motion reversing mechanism, such as has been described, between the lever 177 and the clutch 113. By adjusting this motion reversing mechanism a movement of the lever 177, for instance toward the left, can be made to throw the clutch collar 113 either toward the left or toward the right as may be required.

Preferably I provide an interlocking mechanism which prevents the adjustment of the aforesaid motion reversing mechanism except when the lever 127 is in the proper position to make such adjustment necessary. As illustrated in Fig. 17 the rod 179 carries a grooved collar 185 which is engaged by projections on a hand lever 186. This hand lever is movable about a vertical pivot and is adapted to be used for moving the rod 179 inward or outward as required. The lever 186 is provided at the other side of the pivot with two spaced locking dogs 187 and 187$^a$. When the lever 186 is in its central neutral position, as shown, the dogs 187 and 187$^a$ clear the lever 127$^a$ and permit the lever to be freely moved. The dog 187 is so located that it prevents the inward movement of the lever 186 except when the lever 127$^a$ is in its right-hand position; and the dog 187$^a$ is so located that it prevents the outward movement of the lever 186 except when the lever 127$^a$ is in its left-hand position. The dog 187 also serves as a lock to hold the lever 127$^a$ in its right-hand position so long as the lever 186 remains in its inner position; and the dog 187$^a$ serves as a lock to hold the lever 127$^a$ in its left-hand position so long as the lever 186 remains in its outer position.

The construction which I have described constitutes an interlocking mechanism which prevents the movement of the rod 179 to reverse the connection between the lever 177 and the clutch 113 except when the position of the clutch 125 is reversed. The mechanism also serves to prevent movement of the clutch 125 except when the connection is broken between the lever 177 and the clutch 113. This automatic mechanism prevents the operator from carelessly adjusting the parts so that the dogs 182 and 183 will fail to reverse the table at the proper times.

As has already been stated, the grinding wheel 7 is mounted on a slide 8 which is movable forward and backward on suitable ways on the frame. For controlling the forward and backward movement of the wheel, either to bring the wheel into operative relationship to the work or to feed the wheel during grinding, I provide a suitable feed mechanism, preferably hand operated. As illustrated (Figs. 5 and 11), the slide 8 carries a rack 188 which meshes with a spur pinion 189 carried by a vertical shaft 190. This shaft 190 is provided at its lower end with a bevel gear 191 which meshes with a bevel pinion 192. The pinion 192 is mounted at the rear end of a transverse horizontal shaft 193. At the forward end of the shaft is a spur gear 194 meshing with a pinion 195. These gears are mounted in a housing 196 secured to the front of the main frame. The pinion 195 is carried by a shaft 197 mounted in the housing and this shaft also carries a gear 198. The gear 198 meshes with an idler gear 199 carried by a shaft 200 mounted in the housing. This idler gear 199 also meshes with a pinion 201 on a transverse shaft 202 carried by the housing. Secured to the front end of the shaft 202 is a hand wheel 203. It will be clear that by means of the hand wheel, power may be transmitted through the gearing described to move the slide 8 and the wheel 7 forward or backward as required. Preferably, in order to take up lost motion in the gearing, there is provided a counterweight 204 which is connected with the slide 8 by means of a chain 205, the chain passing over an idler pulley 206.

Preferably there is an arm 207 frictionally connected to the hub of the hand wheel 203. This arm is provided with a pointer 208 adapted to coöperate with graduations 209 formed on the rim of the hand wheel. A stop 210 is pivoted at 211 to the main frame and normally lies in the path of the arm 207. When the hand wheel with the arm is turned in the counter-clockwise direction the stop engages the arm and stops the movement thereof. However, the arm 207 is provided at 212 with a cam surface which is adapted to lift the stop 210 when the hand wheel and the arm are turned in the clockwise direction.

For coöperating with the grinding wheel I provide a suitable steady rest (Fig. 11) adapted to support the work and hold it in alinement. I do not limit myself to any one form of steady rest but in the drawings I have shown a construction which is suitable. In the drawings the steady rest is designated as a whole by 213, being mounted on an extension of the housing 196. The housing has a transverse slide which carries the main frame 214 of the steady rest. Forward and backward adjustment is secured by means of a screw 215 and the steady rest can be locked in adjusted position by means of bolts 216, 216. There are three studs 217, 218 and 219 for engaging the work. The lower stud is vertically adjustable, and the upper stud is also vertically adjustable and is adapted to be swung upward about a pivot at 220 to permit the work to be put in place and taken out. A clamping screw 221 with a knob 222 serves to lock the upper stud in engagement with the work.

I provide means for supplying water to the grinding wheel at a point adjacent the work, this means comprising a nozzle 223 which is connected with a series of pipes 224. Preferably these pipes are mounted in part on a casing or guard 225 which partly incloses the wheel. A valve 226 is provided for starting and stopping the flow of water. The water can be supplied from an external source, but preferably I provide a water pump as a permanent part of the machine.

The aforesaid trough 42 (Figs. 3 and 4) discharges into a tank 227 in which is positioned a pump 228. The pump is of the centrifugal type and has its rotor 229 near the bottom of the tank. The pump is driven by means of a vertical shaft 230 which carries at its upper end a belt pulley 231. A belt 232 passes over and around the belt pulley 231 and also over and around a belt pulley 233 on the main drive shaft 15. For guiding the belt 232 there are suitable idler pulleys 234 and 235. The discharge side of the pump communicates directly with the pipe 224 which leads the water from the pump to the wheel as before described.

Assuming that a cylindrical shaft such as A is to be ground, this is mounted on the centers in the way already described. Initially, the table is so positioned that one end of the shaft, as for instance the right-hand end, is adjacent or opposite the wheel. Then by means of the hand wheel 203 the grinding wheel is advanced until it is in position to reduce the shaft to the required diameter. During movement of the hand wheel the arm 207 is engaged with the stop 210 and after such engagement is held against further rotative movement. The pointer 208 on the arm therefore serves, in coöperation with the scale 209, to indicate the amount of turning of the hand wheel and therefore the amount of advance of the grinding wheel. The back rest 213 is adjusted to properly engage and support the shaft.

The machine is now ready for the commencement of the grinding operation, it being assumed that the several levers have been manipulated to properly adjust the clutches and the gearing. The lever 106$^d$ is so positioned as to give the required speed ratio between the travel of the table and the rotation of the work, this ratio being determined by the diameter of the work, the nature of the material, the amount of stock to be removed, etc. The speed of travel of the table and the speed of rotation of the work may both be changed proportionately by means of the levers 90$^e$ and 136$^a$ which operate the clutches, as already described. For grinding, the shaft 107 is to be driven through the change-speed gearing and therefore in the clockwise direction, as indicated in Fig. 14. Inasmuch as the table 3 is to be fed toward the right, the shaft 119 must also be driven in the clockwise direction. To bring this about the clutch collar 125 must be engaged with the clutch teeth 123 on the gear 121, and the lever 127ᵃ must be in its right-hand position.

Inasmuch as the lever 127ᵃ is in its right-hand position, the lever 186 must be adjusted to its inner position to connect the shaft 170 to the gear segment 171. The gear segment 171 meshes with the gear segment 173 connected to the lever 177, and the operator, therefore, by moving the lever 177 toward the left, will turn the segment 171 toward the right or in the clockwise direction. This movement of the segment 171 in the clockwise direction will turn the segment 168 with the shaft 115 in the counter-clockwise direction and will engage the clutch collar 113 with the teeth 112 on the gear 109. In this way the grinding operation is started and the table is moved slowly toward the right, the grinding wheel serving to completely reduce the shaft to the required diameter as it travels longitudinally.

It will be clear that the greater part of the grinding will be effected by the forward or left-hand side of the wheel, which will be worn to a slightly smaller diameter. By the time any given part of the shaft reaches the right-hand side of the wheel it will have been reduced to approximately the finished diameter, thus making it unnecessary for the right-hand side of the wheel to do any appreciable amount of grinding. The right-hand side of the wheel serves merely to polish the work and the wheel is not materially worn at this side. For this reason the diameter of the work from end to end is not appreciably affected by wear of the wheel, and, in fact, quite a number of pieces may usually be ground without the necessity of dressing or truing the grinding wheel.

As has already been described, the bar 156 moves in synchronism with the table but at a slower speed. The dog 183 on the bar is so adjusted that it engages the lug 181 on the lever 177 when the grinding operation is completed. The lever is moved toward the right to its central or neutral position and the clutch collar 113 is disengaged from the teeth 112, thus stopping the table movement.

The operator now turns the hand wheel 203 in the reverse direction to move the grinding wheel backward away from the work, and by moving the lever 177 toward the right out of neutral position he can engage the clutch collar 113 with the teeth 111 and thus cause the table to move toward the left. It will be understood that this backward or return movement of the table is considerably more rapid than the forward or feeding movement. The dog 182 on the bar 156 is so adjusted that it engages the lug 181 when the table reaches its initial position. The lever is moved toward the left to its central or neutral position and the table movement is again stopped. The operator can remove the finished work either before or after the rapid return movement, as may be preferred.

A new piece of work is now put in place and the hand wheel is turned as before to advance the grinding wheel into operative position. The operator turns the hand wheel until the arm 207 engages the stop 210, thus indicating that the wheel is advanced to the same position as before. The operator then starts the feeding movement of the table and the operations before described are repeated.

It is frequently desirable to effect the grinding while the table is moving from right to left instead of from left to right as described. This change is made simply by moving the lever 127ᵃ to its left-hand position and by correspondingly moving the lever 186 to its outer position. The movement of the lever 127ᵃ serves to engage the clutch collar 125 with the teeth 124, thus causing the shaft 119 to rotate in the opposite direction. The movement of the lever 186 to its outer position serves to connect the shaft 170 with the gear segment 172. This connects the lever 177 with the clutch collar 113 through the idler pinion 175, which reverses the motion. As before, feeding must be effected by connection with the gear 109. But the feeding must be started by a movement of the lever 177 toward the right instead of toward the left as before described. It is for this reason that the motion reversing mechanism is provided. When the levers 127ᵃ and 186 have been adjusted as described, the operator, by moving the lever 177 toward the right, can move the clutch collar 113 toward the right, thus starting the feeding movement of the table toward the left. At the end of grinding the dog 182 engages the lug 181 to move the lever 177 toward the left to its neutral position to stop the table. On the return movement the operator moves the lever 177 farther toward the left to engage the clutch collar 113 with the teeth 111. At the end of the return movement the dog 183 engages the lug 181 and moves the lever 177 toward the right to its neutral position, again stopping the table.

The machine is well adapted for grinding shafts or other parts having differently diametered sections with shoulders between. In fact, it is principally to facilitate such grinding that the means for reversing the feed direction are provided. For accurate work it is important that the wheel be first engaged with the shaft adjacent a shoulder and that the shaft be then moved in the direction to carry the shoulder away from the wheel. If the shaft were moved to bring a shoulder toward the wheel the wear of the wheel on the forward side thereof would make it impossible for the part of the shaft adjacent the shoulder to be accurately ground to the required size; but when the shoulder is moved away from the wheel the rear side of the wheel, which is not subject to appreciable wear, is adjacent the shoulder and serves to accurately grind the adjacent part of the shaft.

It will be understood that the grinding wheel can be dressed from time to time as required by means of a tool of the usual sort which can be secured to the table. However, as already pointed out, it will not be necessary to dress the wheel very frequently when straight cylindrical work is being ground. However, when the machine is being used for shouldered work, particularly work having two oppositely exposed shoulders, it may be necessary to dress the wheel frequently.

What I claim is:

1. In a grinding machine adapted to completely grind the work at a single passage of the grinding wheel therealong, the combination of a grinding wheel, a work-supporting table, means for initially relatively transversely adjusting and holding such members in a work-finishing position, means to rotate the grinding wheel, means to slowly feed one of the members in one direction to traverse the grinding wheel over the work and completely grind and finish the work in one traverse of the grinding wheel thereover, and automatic means to always bring such member to rest at the end of such feeding movement in one direction.

2. In a grinding machine adapted to completely grind the work at a single passage of the grinding wheel therealong, the combination of a grinding wheel, a work-supporting table, means for initially relatively transversely adjusting and holding such members in a work-finishing position, means to rotate the grinding wheel, means to slowly feed one of the members in one direction to traverse the grinding wheel over the work and completely grind and finish the work in one traverse of the grinding wheel thereover, and automatic adjustable means to always bring such member to rest at any desired position at the end of such feeding movement in one direction.

3. In a grinding machine, the combination of a horizontal grinding wheel, a table movable parallelly with the wheel axis, means on the table for holding work in operative relation to the wheel, means for initially moving the wheel transversely of the table to bring it into position to grind the work to the desired size, power means for moving the table slowly in one direction to feed the work longitudinally with respect to the wheel, the work being completely ground to size during such movement, and automatic means for always bringing the table to rest at the end of such feeding movement in one direction.

4. In a grinding machine, the combination of a horizontal grinding wheel, a table movable parallelly with the wheel axis, means on the table for holding work in operative relation to the wheel, power means for moving the table slowly in one direction to feed the work longitudinally with respect to the wheel, power means for moving the table rapidly in the opposite direction to return it to the initial position, and automatic means for stopping the table when it reaches the initial position.

5. In a grinding machine, the combination of a horizontal grinding wheel, a table movable parallelly with the wheel axis, means on the table for holding work in operative relation to the wheel, means for initially moving the wheel transversely of the table to bring it into position to grind the work to the desired size, power means for moving the table slowly in one direction to feed the work longitudinally with respect to the wheel, the work being completely ground to size during such movement, power means for moving the table rapidly in the opposite direction to return it to the initial position, and automatic means for stopping the table when it reaches the initial position.

6. In a grinding machine, the combination of a horizontal grinding wheel, a table movable parallelly with the wheel axis, means on the table for holding work in operative relation to the wheel, power means for moving the table slowly in one direction to feed the work longitudinally with respect to the wheel, automatic means for bringing the table to rest at the end of the feeding movement, power means for moving the table rapidly in the opposite direction to return it, and automatic means for bringing the table to rest at the end of the return movement.

7. In a grinding machine, the combination of a horizontal grinding wheel, a table movable parallelly with the wheel axis, means on the table for holding work in operative relation to the wheel, power means for moving the table slowly in one direction to feed the work longitudinally with respect to the wheel, adjustable means for automatically bringing the table to rest at any desired position at the end of the feeding movement, power means for moving the table rapidly in the opposite direction to return it, and adjustable means for automatically bringing the table to rest at any desired position at the end of the return movement.

8. In a grinding machine, the combination of a horizontal grinding wheel, a table movable parallelly with the wheel axis, means on the table for holding work in operative relation to the wheel, means for moving the wheel transversely of the table to bring it into position to grind the work to the desired size, power means for moving the table slowly in one direction to feed the work longitudinally with respect to the wheel, the work being completely ground to size during such movement, automatic means for bringing the table to rest at the end of such feeding movement in one direction, and power means for moving the table rapidly in the opposite direction to return it to the initial position.

9. In a grinding machine, the combination of a horizontal grinding wheel, a table movable parallelly with the wheel axis, means on the table for holding work in operative relation to the wheel, power means for moving the table slowly to feed the work longitudinally with respect to the wheel, power means for moving the table rapidly in the opposite direction to return it to the initial position, and means for changing the speed of feed without changing the speed of return.

10. In a grinding machine, the combination of a horizontal grinding wheel, means for holding work in operative relation to the wheel, power means for effecting relative feeding movement between the wheel and the work slowly in one direction and for effecting rapid return movement in the opposite direction, and means for reversing the direction of the slow feed and the direction of the rapid return.

11. In a grinding machine, the combination of a horizontal grinding wheel, a table movable parallelly with the wheel axis, means on the table for holding the work in operative relation to the wheel, power means for moving the table slowly in one direction to feed the work longitudinally with respect to the wheel and for moving the table rapidly in the opposite direction to return it to the initial position, and means for reversing the direction of the slow feed and the direction of the rapid return.

12. In a grinding machine, the combination of a horizontal grinding wheel, a work carrying table movable parallelly with the wheel axis, a table operating shaft rotatable slowly in one direction for feed and rapidly in the opposite for return, and mechanism including reversing gearing between the shaft and the table whereby the table may be fed in either direction and returned in the opposite direction.

13. In a grinding machine, the combination of a horizontal grinding wheel, a work carrying table movable parallelly with the wheel axis, power means for moving the table slowly in one direction to feed the work and for moving the table rapidly in the opposite direction to return it to the initial position, means for changing the speed of feed without changing the speed of return, and means for reversing the direction of the slow feed and the direction of the rapid return.

14. In a grinding machine, the combination of a horizontal grinding wheel, a work carrying table movable parallelly with the wheel axis, power means for moving the table slowly in one direction to feed the work, automatic means for bringing the table to rest at the end of the feeding movement, power means for moving the table rapidly in the opposite direction to return it to the initial position, automatic means for bringing the table to rest at the end of the return movement, and means for reversing the direction of the slow feed and the direction of the rapid return.

15. In a grinding machine, the combination of a horizontal grinding wheel, a work carrying table movable parallelly with the wheel axis, power means for moving the table slowly in one direction to feed the work and for moving the table rapidly in the opposite direction to return it to the initial position, means for reversing the direction of the slow feed and the direction of the rapid return, a device automatically operable in accordance with the table movement for starting and stopping the movement of the table in either direction, and a motion reversing mechanism whereby movement of the device in either direction may start the feed and movement in the opposite direction may start the return.

16. In a grinding machine, the combination of a horizontal grinding wheel, a work carrying table movable parallelly with the wheel axis, power means for moving the table slowly in one direction to feed the work and for moving the table rapidly in the opposite direction to return it to the initial position, means for reversing the direction of the slow feed and the direction of the rapid return, means including a clutch and a pivoted lever for starting and stopping the movement of the table in either direction, stops movable with the table for engaging and moving the lever, and a motion reversing mechanism interposed between the lever and the clutch whereby movement of the lever in either direction may start the feed and movement in the opposite direction may start the return.

17. In a grinding machine, the combination of a horizontal grinding wheel, a work carrying table movable parallelly with the wheel axis, a table operating shaft rotatable slowly in one direction for feed and rapidly in the opposite direction for return, mechanism including reversing gearing between the shaft and the table whereby the table may be fed in either direction and returned in the opposite direction, means including a pivoted lever for starting and stopping the rotation of the table operating shaft in either direction as aforesaid, dogs movable with the table for engaging and moving the lever, and a motion reversing mechanism associated with the lever, whereby movement of the lever in either direction may start the shaft in the direction for feed and movement of the lever in the opposite direction may start the shaft in the direction for return.

18. In a grinding machine, the combination of a horizontal grinding wheel, a work carrying table movable parallelly with the wheel axis, power means for moving the table slowly in one direction for feed and rapidly in the opposite direction for return, means for reversing the direction of the slow feed and the direction of the rapid return, means including a pivoted lever for starting and stopping either the feeding movement or the return movement of the table, dogs movable with the table for engaging and moving the lever, a motion reversing mechanism associated with the lever whereby movement of the lever in either direction may start the feed and movement in the opposite direction may start the return, and an interlocking device associated with the means for reversing the directions of feed and return and with the motion reversing mechanism.

19. In a grinding machine, the combination of a horizontal grinding wheel, a work carrying table movable parallelly with the wheel axis, a table operating shaft rotatable slowly in one direction for feed and rapidly in the opposite direction for return, mechanism including reversing gearing between the shaft and the table whereby the table may be fed in either direction and returned in the opposite direction, means including a pivoted lever for starting and stopping the rotation of the table operating shaft in either direction as aforesaid, dogs movable with the table for engaging and moving the lever, a motion reversing mechanism associated with the lever and the clutch whereby movement of the lever in either direction may start the shaft in the direction for feed and movement of the lever in the opposite direction may start the shaft in the direction for return, and an interlocking device associated with the means for reversing the directions of feed and return and with the motion reversing mechanism.

20. In a grinding machine, the combination of a horizontal grinding wheel, a work carrying table movable parallelly with the wheel axis, power means for moving the table to feed the work longitudinally with respect to the wheel, a sliding bar supported independently of the table, gearing for moving the bar synchronously with the table, and means including dogs carried by the bar for controlling the movements of the table.

21. In a grinding machine, the combination of a horizontal grinding wheel, a work carrying table movable parallelly with the wheel axis, power means for moving the table to feed the work longitudinally with respect to the wheel, a sliding bar, gearing for moving the bar synchronously with the table but at a slower speed and through a smaller range, and means including dogs carried by the bar for controlling the movements of the table.

In testimony whereof I hereto affix my signature.

BENGT M. W. HANSON.